United States Patent [19]

Okayasu

[11] Patent Number: 5,898,326

[45] Date of Patent: Apr. 27, 1999

[54] SIGNAL TRANSMISSION CABLE DRIVER APPARATUS WITHOUT A PEAKING COIL

[75] Inventor: Toshiyuki Okayasu, Saitama, Japan

[73] Assignee: Advantest Corp., Tokyo, Japan

[21] Appl. No.: 08/998,519

[22] Filed: Dec. 26, 1997

[30] Foreign Application Priority Data

Dec. 25, 1996 [JP] Japan .................. 8-345064

[51] Int. Cl.[6] .................. H03K 5/02; H03K 19/003
[52] U.S. Cl. .................. 327/112; 327/333; 327/379; 327/404; 327/563; 326/86; 326/30
[58] Field of Search .................. 326/30, 86; 327/108, 327/111, 112, 333, 379, 403, 404, 362, 563

[56] References Cited

U.S. PATENT DOCUMENTS

| | | | |
|---|---|---|---|
| 4,335,360 | 6/1982 | Hoover | 330/264 |
| 5,264,743 | 11/1993 | Nakagome et al. | 326/56 |
| 5,420,538 | 5/1995 | Brown | 330/252 |
| 5,489,878 | 2/1996 | Gilbert | 331/57 |
| 5,760,601 | 6/1998 | Frankeny | 326/30 |

*Primary Examiner*—Timothy P. Callahan
*Assistant Examiner*—Terry L. Englund
*Attorney, Agent, or Firm*—Muramatsu & Associates

[57] ABSTRACT

A signal transmission cable driver apparatus for transmitting an input signal through a transmission cable performs frequency compensation without using a peaking coil. The signal transmission cable driver apparatus includes a transmission driver for receiving the input signal and driving the transmission cable to transmit the input signal therethrough, and transition signal drive means having a capacitor circuit for detecting transition of the input signal by charge/discharge in the capacitor circuit and amplifying currents in said charge/discharge of the capacitor circuit, wherein the currents amplified by the transition signal drive means are superimposed on the input signal driven by the transmission driver at an input of the transmission cable.

9 Claims, 7 Drawing Sheets

SIGNAL TRANSMISSION CABLE DRIVER APPARATUS WITHOUT A PEAKING COIL

BACKGROUND OF THE INVENTION

1. Field of the Invention

This invention relates to a signal transmission cable driver apparatus which is able to compensate waveform deteriorations at a receiving point of a transmission cable for accurately transmitting signal waveforms of high speed logic signals and the like.

2. Background Art

In transmitting a high-speed logic signal through a long transmission line, it is not easy, at a receiving end (reproduction port), to accurately reproduce the signal waveforms originally provided to a sending end (transmission port). Examples of transmission lines or cables for use in such high speed logic signal transmission include coaxial cables, twist pair cables, and printed circuit board pattern wiring. The transmission cables involve transmission loss which deteriorates the waveforms of the logic signals propagating therethrough.

The transmission loss in such a transmission line is frequency dependent such that a power level of the signal in the line is decreased typically by a root of the frequency (½ root) of the signal. The transmission loss also varies depending on the types of transmission medium, typically insulation materials surrounding the cable cores. Major factors of the transmission loss includes a skin effect of transmission line, dielectric loss of insulation material of the transmission line, and the like.

As a result of the transmission loss, the signal waveform is impaired by the time when it reached the receiving port because high frequency components thereof, such as amplitudes of sharp edges, are reduced through the transmission line. Thus, it is not possible to accurately reproduce the original waveforms and/or the original timings of the logic signal at the receiving end.

In case where a logic signal of a narrow pulse width is transmitted through the transmission line, a received signal will be further deteriorate as shown in FIG. 8. In addition to the reduction of the signal amplitude, the reproduced signal at the receiving end may have a pulse width $R_{w2}$ which is smaller than a pulse width $R_{w1}$ at the sending end. This means that the timing accuracy of the logic signals is also adversely affected by the transmission loss. When the pulse width of the logic signal is too narrow, such a signal may even disappear during the travel through the transmission line.

FIG. 6 shows an example of signal transmission cable driver in the conventional technology which is a differential transmission circuit having a frequency compensation circuit. This circuit has a structure in which a transmission port transmits a differential signal through two coaxial cables or a pair of twist cables and a receiving port receives the differential signal with no reflection by connecting a terminal resistor at the receiving end. As shown in FIG. 6, frequency compensation circuits are provided at both the transmission port and the receiving port to compensate the high frequency components that are lost because of the transmission loss in the transmission cables when traveling through the cables. Each of the frequency compensation circuits is formed with coils and resistors.

The differential transmission circuit of FIG. 6 includes a transmission driver 70, a pair of transmission cables 90, and a transmission signal receiver circuit 80. The transmission driver 70 is formed of a differential driver circuit 72, sending port pull-up resistors 74, and a frequency compensation circuit 75. The transmission signal receiver circuit 80 is formed of a differential receiver circuit 82, terminal resistors 84, and a frequency compensation circuit 85.

FIG. 7 shows waveforms at several points of this transmission circuit. FIG. 7a shows an input transmission signal 100 which is a differential pulse signal of rectangular waveforms provided to a pair of input terminals of the transmission driver 70. FIG. 7b shows a pulse wave $91_{WAV}$ at an output of the transmission driver 70. The pulse wave $91_{WAV}$ has a high frequency compensated waveform as shown by the shaded portions of FIG. 7b. The high frequency compensated waveform is created by adding a peak current $I_{peak}$ produced by the frequency compensation circuit 75 to the output of the transmission driver 70.

FIG. 7d shows a waveform $93_{WAV}$ received by the transmission receiver circuit 80 at the end of the transmission cable 90. The received waveform $93_{WAV}$ has a high frequency compensated waveform shown by the shaded portions which is formed by the peak current produced by the frequency compensation circuit 75 mentioned above as well as a peak current produced by the frequency compensation circuit 85. FIG. 7c shows a logic waveform $81_{out}$ that is reproduced by the differential receiver circuit 82. When the frequency compensation circuit 85 is not present, the logic signal $81_{out}$ tends to become a signal with an unstable range such as shown in the shaded portions of FIG. 7c, or with timing fluctuations or variations, or jitters.

By utilizing the frequency compensation circuits, such problems of signal waveform deterioration can be avoided. Thus, more accurate reproduction of transmission signals is achieved by maintaining a predetermined relationship, i.e., compensating the transmission loss in the high frequency range between the input transmission signal 100 and the output logic signal $81_{out}$.

For a transmission circuit that requires high timing accuracy, the output logic signal $81_{out}$ is required to have an accurate timing reproduction that corresponds to the timing of the input transmission signal 100. The frequency compensation circuits 75 and 85 are effective to achieve this goal. The frequency compensation circuit 75 in the sending port includes coils 76 and resistors 78 for peaking the input logic signal 100 to be transmitted. The frequency compensation circuit 85 of the receiving port includes coils 86 and resistors 88 in series with the terminal resistor 84 for peaking the received logic signal. The example of FIG. 6 is a case wherein both the sending port and the receiving port include the frequency compensation circuits. However, another configuration is possible in which only one of the ports has a frequency compensation circuit. The above circuit configuration is used for transmission of high-speed, high timing accuracy signals through a plurality of transmission cables such as between a main frame of a semiconductor test system and a test head.

In the foregoing transmission circuit, all of the circuit components, with the exception of the peaking coils 76 and 86, can be integrated into an LSI circuit relatively easily through a monolithic IC process. However, the peaking coils 76 and 86 need to have a winding structure. Thus, although means for miniaturizing coils by chip inductor, etc. has been developed, further drastic miniaturization is difficult. In particular, integration of the coils into a monolithic IC such as an LSI is practically impossible. Thus, coils are major factors in the high speed logic transmission that prevent further improvement of the mounting density in the transmission apparatus. This mounting density problem will be especially serious in semiconductor test apparatuses, super high-speed computers, and automatic switching systems which require high-speed logic signal transmission through multiple channels.

SUMMARY OF THE INVENTION

Therefore, it is an object of the present invention to provide a transmission cable driver apparatus which has a frequency compensation circuit for compensating a high frequency transmission loss without using inductor coils or windings therein.

It is another object of the present invention to provide a transmission cable driver apparatus that can be integrated into an LSI circuit by obviating inductance coils from a peaking circuit to compensate the high frequency loss in transmission cables.

It is a further object of the present invention to provide a transmission cable driver apparatus which has a frequency compensation circuit for compensating a high frequency transmission loss by including a peaking circuit formed of capacitors and resistors.

It is a further object of the present invention to provide a transmission cable driver apparatus which has a frequency compensation circuit for compensating a high frequency transmission loss by including an active peaking circuit formed of amplifiers and capacitors.

It is a further object of the present invention to provide a transmission cable driver apparatus which can achieve an improved impedance matching ability with a transmission cable.

It is a further object of the present invention to provide a transmission cable driver apparatus which has an active peaking circuit for producing a large peak current by a current Miller amplifier.

It is a further object of the present invention to provide a transmission cable driver apparatus which has an active peaking circuit for generating large peak currents which enable to produce sharp transition edges of the logic signal to be transmitted to accurately reproduce logic timings at a receiving port.

It is a further object of the present invention to provide a transmission cable driver apparatus which is capable of minimizing an overall size of the apparatus by integrating all of the components into an LSI circuit.

The signal transmission cable driver apparatus of the present invention for transmitting an input transmission signal through a transmission cable performs the frequency compensation without using a peaking coil. The signal transmission cable driver apparatus includes a transmission driver for receiving the input transmission signal and driving the transmission cable to transmit the input signal therethrough, and transition signal drive means having a capacitor circuit for detecting transition of the input signal by charge/discharge in the capacitor circuit and amplifying currents in said charge/discharge of the capacitor circuit, wherein the currents amplified by the transition signal drive means are superimposed on the input signal driven by the transmission driver at an input of the transmission cable.

The transition signal drive means of the present invention includes a switch circuit which changes between ON and OFF states based on the input transmission signal, the capacitor circuit connected to the switch circuit, and a transition current driver connected to the switch circuit to amplify the charge/discharge current flowing through the capacitor circuit.

The capacitor circuit is formed of a capacitor. Alternatively, the capacitor circuit is formed of a capacitor and a resistor which are series connected with one another. In a further aspect, the capacitor circuit of the present invention is formed of a plurality of sets of capacitors and resistors, each set of which has a capacitor and a resistor connected in series with one another. Further, the plurality of sets of the capacitors and resistors include a plurality of switches for selectively connecting and/or disconnecting the capacitors and resistors to produce an arbitrary curve of a CR time constant.

According to the present invention, the transmission cable driver apparatus has a frequency compensation circuit for compensating a high frequency transmission loss without using inductor coils or windings therein. The frequency compensation circuit is formed of the peaking circuit having capacitor and the transistors so that the driver apparatus can be integrated into an LSI circuit.

Further, the transmission cable driver apparatus of the present invention has the frequency compensation circuit for compensating the high frequency transmission loss by including an active peaking circuit formed of amplifiers, capacitors and resistors. The active peaking circuit is able to produce peak currents with a large peak amplitude which are added to the logic signal to be transmitted through the transmission cable to accurately reproduce the waveform of the logic signal at the receiving port. Moreover, the active peaking circuit can generate the large peak currents which are enhanced in the amplitudes to produce sharp transition edges of the logic signal to be transmitted so as to accurately reproduce the logic timings at the receiving port.

The transmission cable driver apparatus of the present invention can achieve improved impedance matching with the transmission cable. The driver apparatus is capable of minimizing an overall size of the apparatus by integrating all of the components in an IC circuit. The above features of the present invention further improves the mounting density, enabling high speed logic signal transmission in semiconductor test apparatuses, super high-speed computers, and automatic switching systems that transmit high-speed logic signals through multiple channels.

BRIEF DESCRIPTION OF THE DRAWINGS

FIG. 4b shows schematic diagrams of waveform examples related to the transition signal drive means of FIG. 4a.

DETAILED DESCRIPTION OF THE PREFERRED EMBODIMENTS

Figure 1:
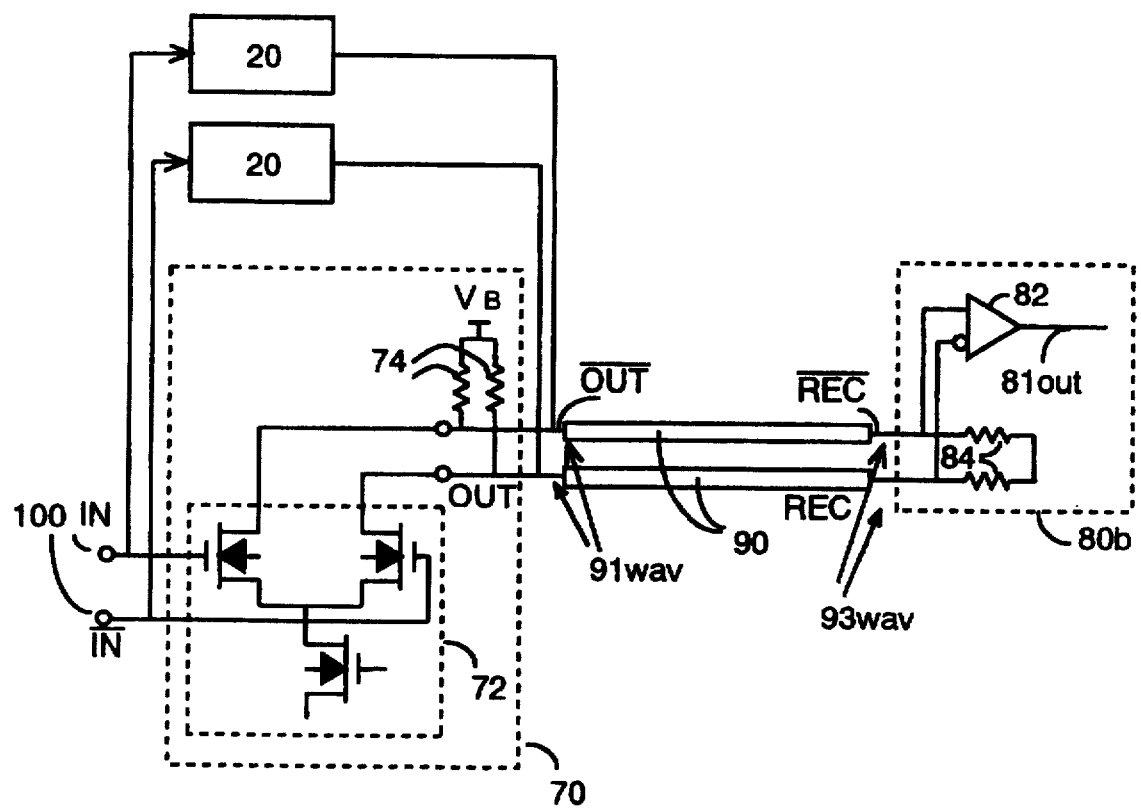
FIG. 1 is a block diagram showing a first embodiment of a transmission cable driver apparatus of the present invention having a frequency compensation circuit for driving a differential transmission cable.
Figure 6:
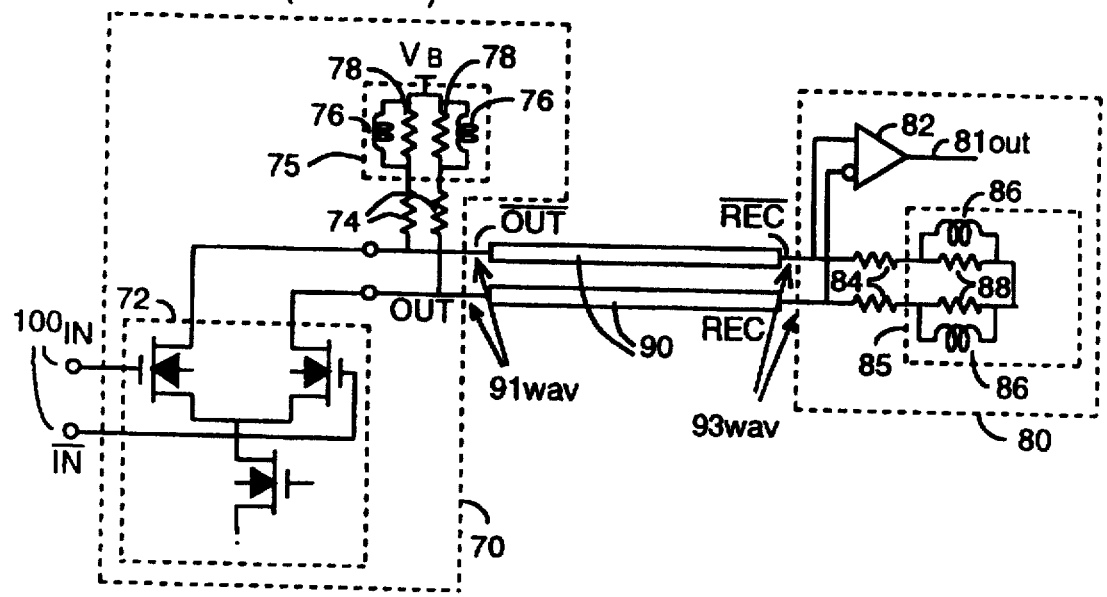
FIG. 6 is a block diagram showing an example of a conventional transmission driver apparatus having a frequency compensation circuit.

The first embodiment of the present invention is explained with reference to FIG. 1 and FIG. 4. Compared to the configuration of prior art in FIG. 6, in the example of transmission cable driver apparatus in FIG. 1, the frequency compensation circuits 75 and 85 of FIG. 6 are replaced with a pair of transition signal drive means 20 each of which is provided between each output and input of the transmission driver 70. In this example, the transmission driver 70 is a differential amplifier having pull up resistors 74 like the conventional example of FIG. 6. The transmission signal drive means 20 and transmission driver 70 form a frequency compensation circuit of the present invention. Also in this example, the transmission cable driver apparatus does not have a frequency compensation circuit in a receiving port 80b. The receiving port 80b includes terminal resistors 84 and differential receiver circuit 82 to reproduce an output signal $81_{our}$.

The transition signal drive means 20 is basically a differential circuit to detect a signal transition and produce a peak current in response to the signal transition. In the example of FIG. 4, the transition signal drive means 20 has a complementary configuration, and generates a peak current for the frequency compensation of high frequency transmission loss in the transmission cable 90.

Figure 4A:
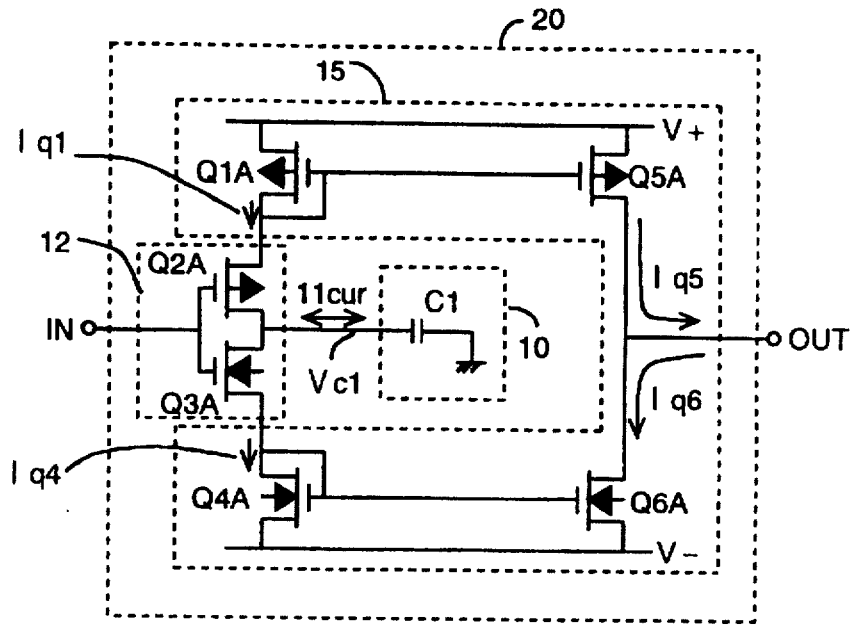
FIG. 4a is a circuit diagram showing an example of a transition signal drive means to be used in the transmission cable driver apparatus of the present invention.
Figure 4A:
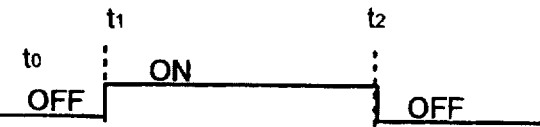
Figure 4A:
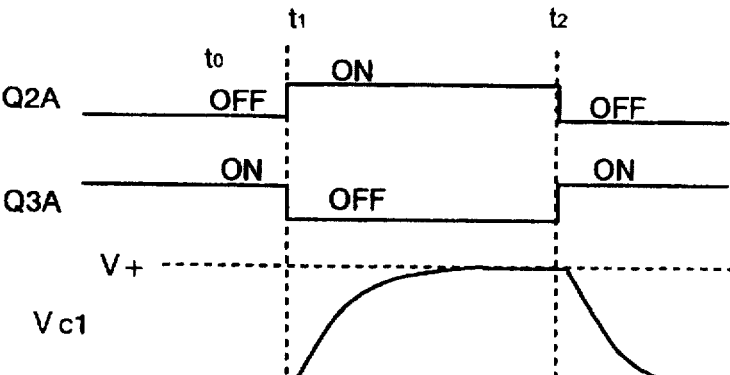
Figure 4A:
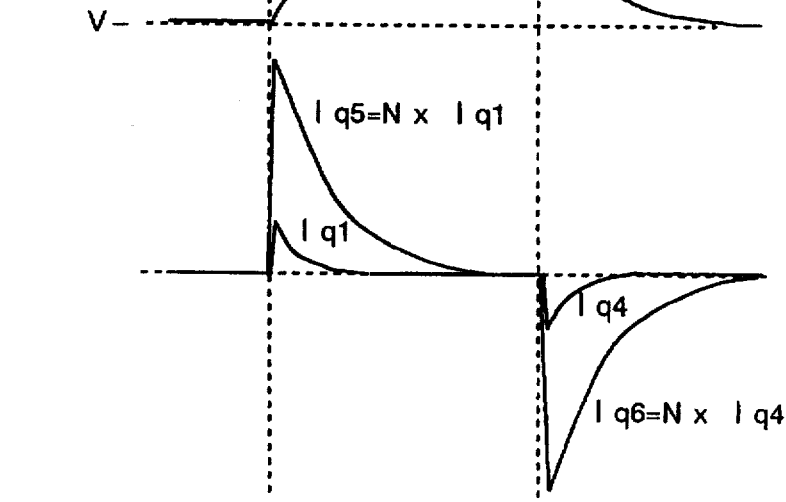

As shown in FIG. 4a, the transition signal drive means 20 has a complementary switch 12, a capacitor circuit 10, and a transition current driver 15. The complementary switch 12 is formed of switching transistors Q2A and Q3A. The capacitor circuit 10 includes a capacitor C1. The transition current driver 15 is formed of a pair of transistors Q1A and Q5A, and a pair of transistors Q4A and Q6A, each pair of which functions as a current Miller circuit. Because of the complementary configuration, the transition signal drive means 20 generates peak currents of either positive or negative polarities.

The operation of the transition signal drive means 20 is explained with reference to FIGS. 4a and 4b. Suppose an initial state of an input signal 100 (given at an input terminal IN) to be transmitted is in a high-level, a voltage $V_{c1}$ of the capacitor C1 is $V_-$ since the switching transistor Q3A is ON at time $t_0$ as shown in FIGS. 4b(1)–(3).

When the input signal 100 shifts to a low level at time $t_1$, the switching transistor Q2A is turned ON while the switching transistor Q3A is turned OFF as shown in FIGS. 4b(1) and 4b(2). Also, the voltage $V_{c1}$ of the capacitor C1 changes to $V_+$ by flowing a charge current $I_{q1}$ shown in FIG. 4b(4) which is a charge/discharge current $11_{cur}$ to and from the capacitor C1 shown in FIG. 4a. The charge/discharge current $11_{cur}$ flows based on a CR time constant defined by a capacitance value of the capacitor C1 and an internal resistance value of the switching transistor Q2A and the current Miller transistor Q1A.

In FIG. 4a, the transistors Q1A and Q5A form a current Miller circuit as noted above. Thus, as shown in FIG. 4b(4), a positive peak current $I_{q5}$ which is a current N times larger than the charge current $I_{q1}$ is generated at an OUT terminal of the transition signal drive means 20. Here, N is a magnification of the current Miller of the transistor Q5A over the transistor Q1A. Within the same semiconductor chip, the magnification N corresponds to a ratio of transistor sizes. Preferably, the capacitance value of the capacitor C1 should set to be relatively small which makes easier in integrating the capacitor C1 into an LSI circuit.

Figure 7A:
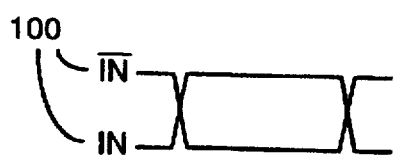
FIGS. 7a–7d are schematic diagrams showing a waveform example at each point of the conventional transmission driver apparatus of FIG. 6 having the frequency compensation circuit.
Figure 7B:
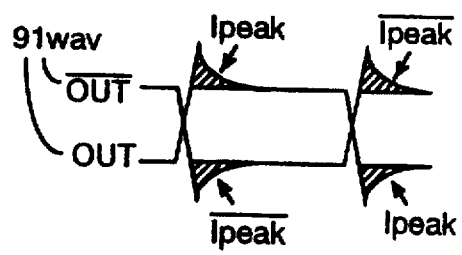
Figure 7C:
Figure 7D:
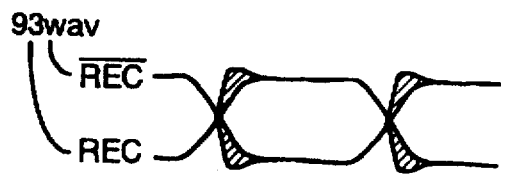
Figure 8:
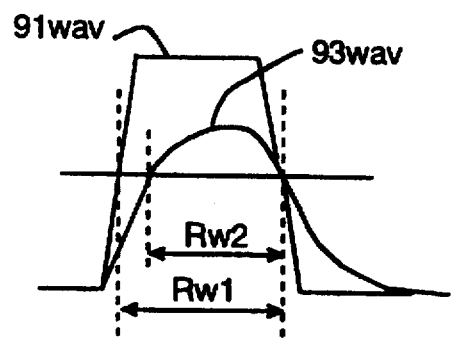
FIG. 8 is a schematic diagram showing an example of waveform in the receiving end of a signal transmission system when a narrow pulse is transmitted through a cable without using the frequency compensation circuit.

Since the transition signal drive means 20 is in the complementary configuration, when the input signal 100 is shifted from the low level state to the high level state at time $t_2$ as shown in FIG. 4b, a negative peak current $I_{q6}$ is generated by the current Miller transistor Q6A which is N times larger than a peak current $I_{q4}$ flowing in the transistor Q4a. Consequently, as shown in shaded areas of FIG. 7b, the transmission driver 70 outputs the frequency compensated signal $91_{wav}$ having both the positive and negative peaks at the rising and falling transitions, respectively. The frequency compensated signal $91_{wav}$ is supplied to the transmission cable 90. Thus, the transmission cable driver apparatus of the present invention achieves the same effects of the frequency compensation performed by the conventional circuit using the peaking coils and pull-up resistors.

Since the transmission cable driver apparatus of the present invention performs the frequency compensation by an active circuit formed of the transistors and capacitor, a peak current of much larger amplitude than that flows in the conventional peaking coils can be generated. As a result, the frequency compensation of more superior characteristics to the conventional ones can be achieved. Consequently, even when the transmission cable 90 is elongated, the transmission loss in the high frequency range can be easily compensated. Thus, the limit of the length of transmission cable 90 is significantly relaxed. Further, it becomes unnecessary to use an expensive cable that has higher frequency quality. Thus, applicability of the transmission cables and associated components are widened while their cost is reduced.

Figure 5A:
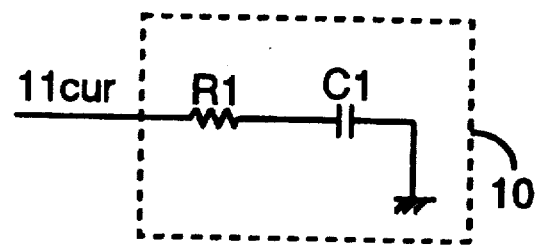
FIGS. 5a, 5b and 5c are circuit diagrams showing circuit examples of capacitor means to be used in the transition signal drive means of the present invention.

Other circuit configuration of the capacitor circuit 10 that detects the signal transition is explained with reference to FIGS. 5a–5c. In the example of FIG. 4a, only the capacitor C1 is used in the capacitor circuit 10. However, the capacitor circuit 10 may incorporate a resistor R1 connected in series with the capacitor C1 as shown in FIG. 5a to create a desired value of CR time constant.

Figure 5B:
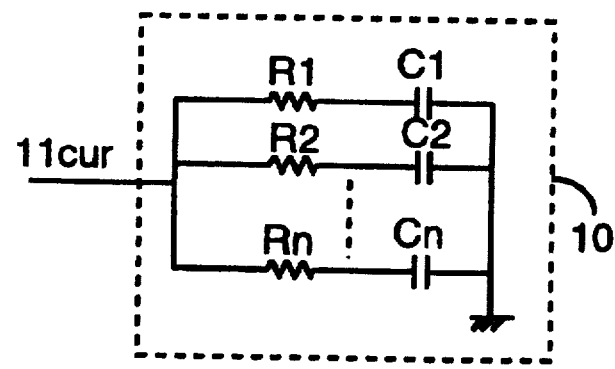

Further, as shown in FIG. 5b, the capacitor circuit 10 can be configured by a plurality of series connected capacitors and resistors to have desired multiple CR time constants. Namely, in FIG. 5b, resistors R1–Rn and capacitors C1–Cn are provided to create a plurality of CR time constant values to achieve optimum frequency compensation curves corresponding to the characteristics of the transmission cable 90.

Figure 5C:
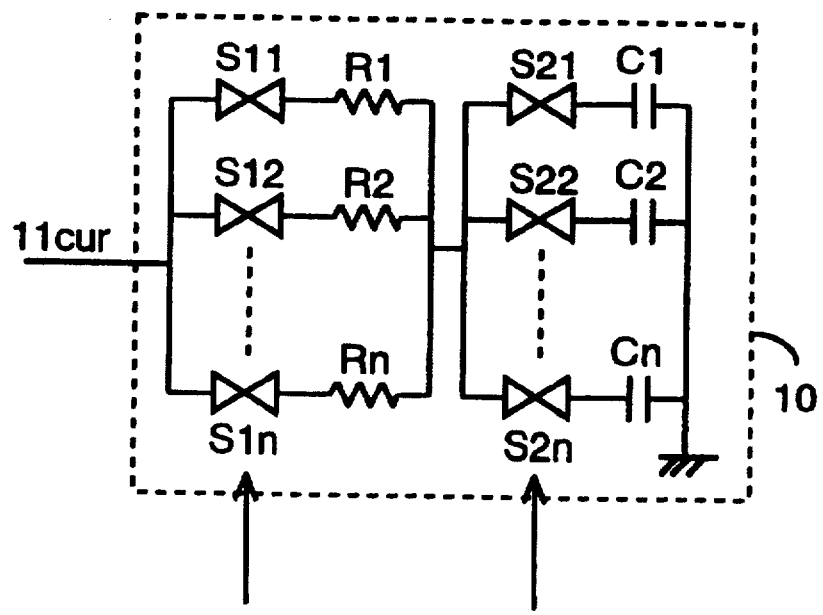

Moreover, as shown in FIG. 5c, another configuration of the capacitor circuit 10 is possible such as having switches $S_{11}$–$S_{1n}$ for the resistors R1–Rn and switches $S_{21}$–$S_{2n}$ for the capacitors C1–Cn. The switches $S_{11}$–$S_{1n}$ and $S_{21}$–$S_{2n}$ can be arbitrary and selectively controllable from an outside controller (not shown). By connecting/disconnecting the desired resistors and capacitors by these switches, desired values of CR time constant and resultant peak currents can be established. Consequently, desired frequency compensation characteristics can be established that can flexibly deal with the high frequency transmission loss property of transmission cables or the variety of lengths of the transmission cable. In addition, the inherent problems of impedance mismatch with the impedance of the transmission cable encountered in the conventional apparatus using peaking coils can be eliminated.

The second embodiment of the present invention is explained with reference to FIG. 2. The example of FIG. 2 has a transmission driver 70b which has a complimentary structure instead of the driver 72 of the differential amplifier structure and the pull up resistor 74 of FIG. 1. The transmission driver 70b includes complementary elements Q33A and Q34A each of which is connected to corresponding input and output terminals. Examples of such complementary elements Q33A and Q34A include LVDS (Low Voltage Differential Signal) devices and LVTTL (Low Voltage TTL) devices in the market.

The complementary elements Q33A and Q34A respectively receive positive and negative supply voltages $V_+$ and $V_-$ through transistors Q31A and Q32A series connected thereto. The transistors Q31A and Q32A function as voltage and current limiters for the complementary elements Q33A and Q34A by regulating the gate voltages $V_{B+}$ and $V_{B-}$. Differential signal transmission for the input signal 100 is carried out by the two complementary elements Q33A and Q34A.

Figure 2:
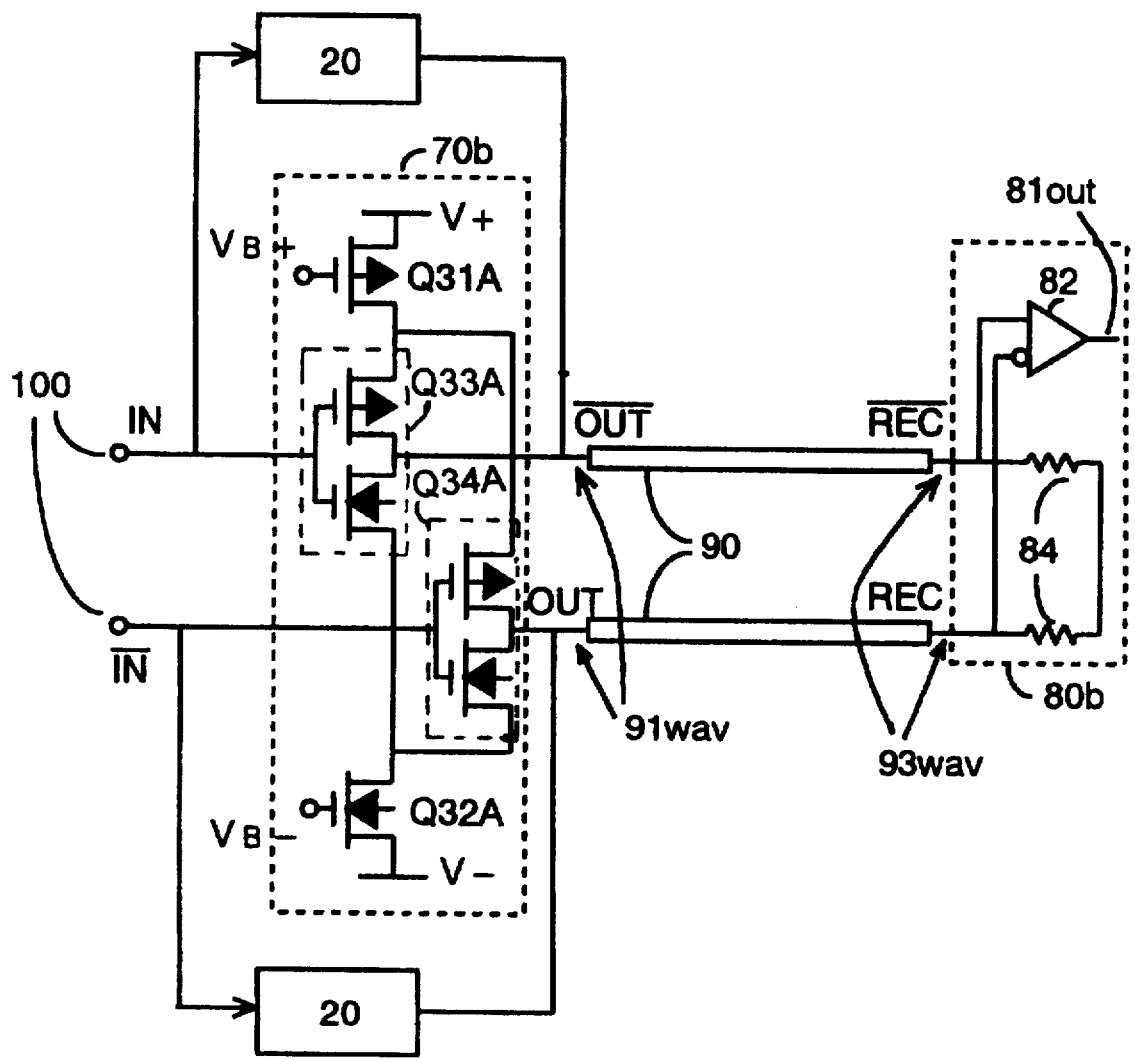
FIG. 2 is a block diagram showing a second embodiment of a transmission cable driver apparatus of the present invention having a frequency compensation circuit for driving a differential transmission cable.

In this configuration of FIG. 2, the output terminal of the transition signal drive means 20 (FIG. 4a) and the output terminal of the transmission driver 70b can be directly connected since the transmission driver 70b includes the current limiters formed by the transistors Q31A and Q32A.

Further in the example of FIG. 2, a resistor may be connected in series between the output terminal OUT of the transmission driver 70b and the transmission cable 90. Such a resistor further improves the current limit function as well as impedance matching with the transmission cable 90. When this impedance matching resistor is provided, reflection in the transmission cable is significantly reduced. Thus, signal transmission of high quality will be achieved, resulting in the logic signal reproduction of high accuracy and high fidelity.

As explained above, the frequency compensation circuit of the present invention is an active circuit formed of the transistor and capacitor. Transition of an input signal is detected by the capacitor having a small capacitance value, and a current flowing through the capacitor is amplified by the transistor to drive the transmission cable 90. Thus, the frequency compensation circuit produces a peak current which is added to the input signal to be transmitted so that the high frequency transmission loss in the cable 90 is compensated. As a result, signal transmission of a high speed logic signal is achieved with high accuracy and fidelity.

In addition, since the coils in the conventional technology are not used in the present invention, and the capacitor can be easily formed in a monolithic integrated circuit, the transmission cable driver apparatus of the present invention can be integrated into an LSI. Further, because of the active circuit, the peak currents $I_{q5}$ and $I_{q6}$ for compensating the transmission loss in the transmission cable can have larger current levels than that of the conventional example using the peaking coils. As a result, a further improvement in the signal transmission of high accuracy and fidelity is achieved.

Figure 3A:
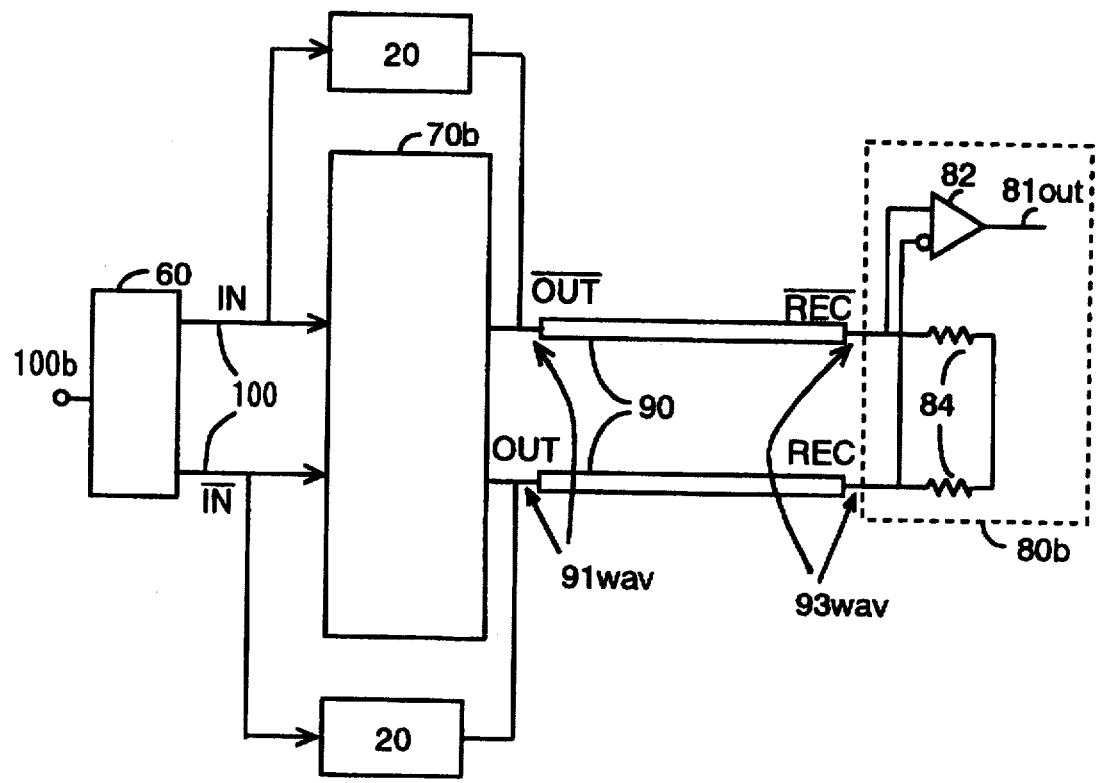
FIG. 3a is a block diagram showing a third embodiment of a transmission cable driver apparatus of the present invention having a frequency compensation circuit for driving a differential transmission cable.

In the embodiment explained in the foregoing, the signal transmission cable driver apparatus has an input configuration for receiving a differential input signal 100. However, it is possible to transmit another type of signal (unbalanced signal) by the driver apparatus of the present invention by incorporating an unbalance to balance converter circuit 60 as shown in FIG. 3a.

Figure 3B:
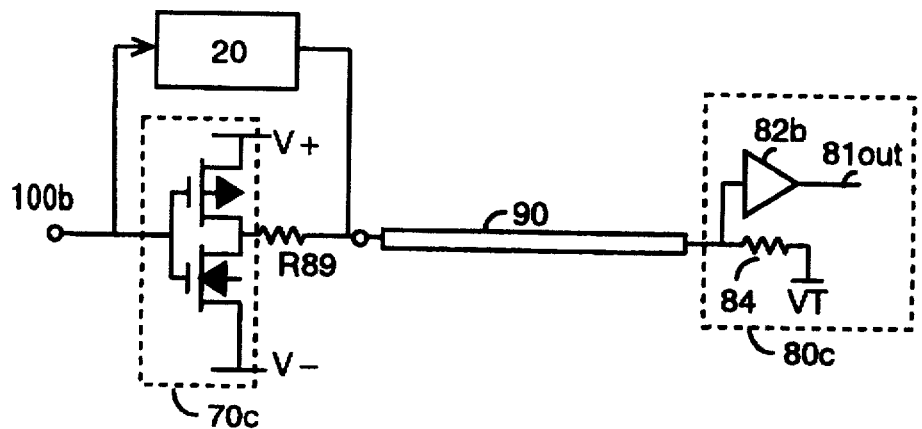
FIG. 3b is a circuit diagram showing a single transmission cable driver apparatus of the present invention.

Further, in the embodiment explained in the foregoing, the transmission cable driver apparatus transmits the input signal to the transmission cable 90 having two lines, such as two coaxial cables or cables of twisted pair. However, the driver apparatus of the present invention can also drive a single line transmission cable 90 as shown in FIG. 3b. In this example, a transmission driver 70c whose input and output is connected by a transition signal drive means 20 drives the transmission cable 90, and a transmission signal receiver circuit 80c having a receiver circuit 82b receives the output of the transmission cable 90.

Figure 9A:
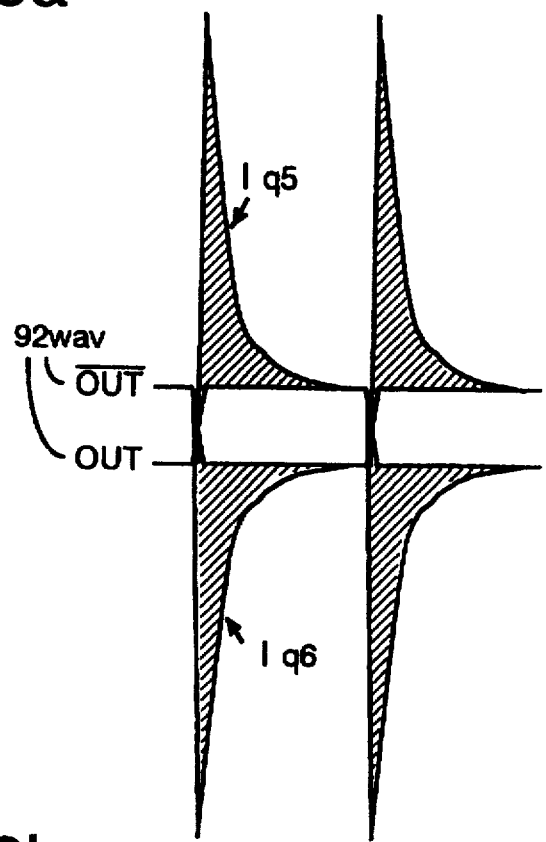
FIGS. 9a and 9b are schematic diagrams showing waveform examples at sending and receiving ports for explaining a situation where enlarged peaks are applied to the pulse signal to be transmitted.
Figure 9B:
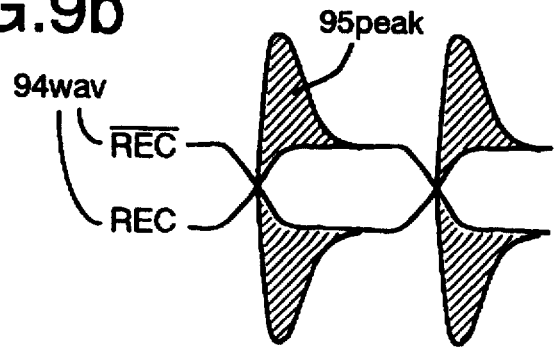

The foregoing description of the embodiments is made mainly on the frequency compensation for the transmission cable 90 to accurately reproduce the high speed logic waveform at the receiving port. However, the present invention is useful when the transmission of the logic signal $81_{out}$ is more important in reproducing the timing of the logic signal rather than reproducing the overall waveform of the logic signal. This example is shown by the waveforms of FIGS. 9a and 9b in which logic signal timings are accurately transmitted through the transmission cable.

In transmitting the logic timing as accurately as possible, it is necessary to provide a sharp transition edge to the transmission cable 90. Since the driver apparatus of the present invention has the active peaking circuit, waveform $92_{wav}$ having large current peaks $I_{q5}$ and $I_{q6}$ as shown in FIG. 9a can be supplied to the transmission cable 90. Consequently, waveform $94_{wav}$ at the receiving port has relatively sharp transition edges to accurately reproduce the logic timing as shown in FIG. 9b although the current peaks $95_{peak}$ are significantly reduced.

In the foregoing explanation of the embodiments of the present invention, the transmission drivers 70, 70b and 70c and the transition signal drive means 20 are directly connected to the transmission cable 90. However, an impedance matching resistor or other impedance matching circuit may be provided between the transmission driver 70 and the transmission cable 90.

As described in the foregoing, according to the present invention, the transmission cable driver apparatus has a frequency compensation circuit for compensating a high frequency transmission loss without using inductor coils or windings therein. The frequency compensation circuit is formed of the peaking circuit having capacitor and the transistors so that the driver apparatus can be integrated into an LSI circuit.

Further, the transmission cable driver apparatus of the present invention has the frequency compensation circuit for compensating the high frequency transmission loss by including an active peaking circuit formed of amplifiers, capacitors and resistors. The active peaking circuit is able to produce peak currents with a large peak amplitude which are added to the logic signal to be transmitted through the transmission cable to accurately reproduce the waveform of the logic signal at the receiving port. Moreover, the active peaking circuit can generate the large peak currents which are enhanced in the amplitudes to produce sharp transition edges of the logic signal to be transmitted so as to accurately reproduce the logic timings at the receiving port.

The transmission cable driver apparatus of the present invention can achieve improved impedance matching with the transmission cable. The driver apparatus is capable of minimizing an overall size of the apparatus by integrating all of the components in an IC circuit. The above features of the present invention further improves the mounting density, enabling high speed logic signal transmission in semiconductor test apparatuses, super high-speed computers, and automatic switching systems that transmit high-speed logic signals through multiple channels.

What is claimed is:

1. A signal transmission cable driver apparatus for transmitting an input transmission signal through a transmission cable, comprising:

a transmission driver for receiving said input transmission signal and driving said transmission cable to transmit said input transmission signal therethrough; and transition signal drive means having a capacitor circuit for detecting transition of said input transmission signal by charge/discharge in said capacitor circuit and amplifying currents in said charge/discharge of said capacitor circuit;

wherein said currents amplified by said transition signal drive means are superimposed on said input transmission signal driven by said transmission driver at an input of said transmission cable.

2. A signal transmission cable driver apparatus as defined in claim 1, wherein said transition signal drive means includes a switch circuit which changes between ON and OFF states based on said input transmission signal, said capacitor circuit connected to said switch circuit, and a transition current driver connected to said switch circuit to amplify said charge/discharge current flowing through said capacitor circuit.

3. A signal transmission cable driver apparatus as defined in claim 1, wherein said capacitor circuit is comprised of a capacitor.

4. A signal transmission cable driver apparatus as defined in claim 1, wherein said capacitor circuit is comprised of a capacitor and a resistor which are series connected with one another.

5. A signal transmission cable driver apparatus as defined in claim 1, wherein said capacitor circuit is comprised of a plurality of sets of capacitors and resistors, each set of which has a capacitor and a resistor connected in series with one another.

6. A signal transmission cable driver apparatus as defined in claim 5, wherein said capacitor circuit further includes a plurality of switches in said plurality of sets of said capacitors and resistors, said switches selectively connecting and/or disconnecting said capacitors and resistors to produce an arbitrary curve of a CR time constant.

7. A signal transmission cable driver apparatus as defined in claim 2, wherein said switch circuit in said transition signal drive means is formed of a pair of switching transistors, and said transition current driver is formed of a first pair of transistors connected to one of said switching transistors and a second pair of transistors connected to another of said switching transistors.

8. A signal transmission cable driver apparatus as defined in claim 1, wherein said transmission driver is a differential amplifier formed of a pair of transistors whose sources are connected with one another.

9. A signal transmission cable driver apparatus as defined in claim 1, wherein said transmission driver is a complementary amplifier formed of a pair of transistors connected in series with one another.

* * * * *